No. 671,602. Patented Apr. 9, 1901.
C. W. LEVALLEY.
CLUTCH SHIPPER.
(Application filed Feb. 10, 1900.)
(No Model.)
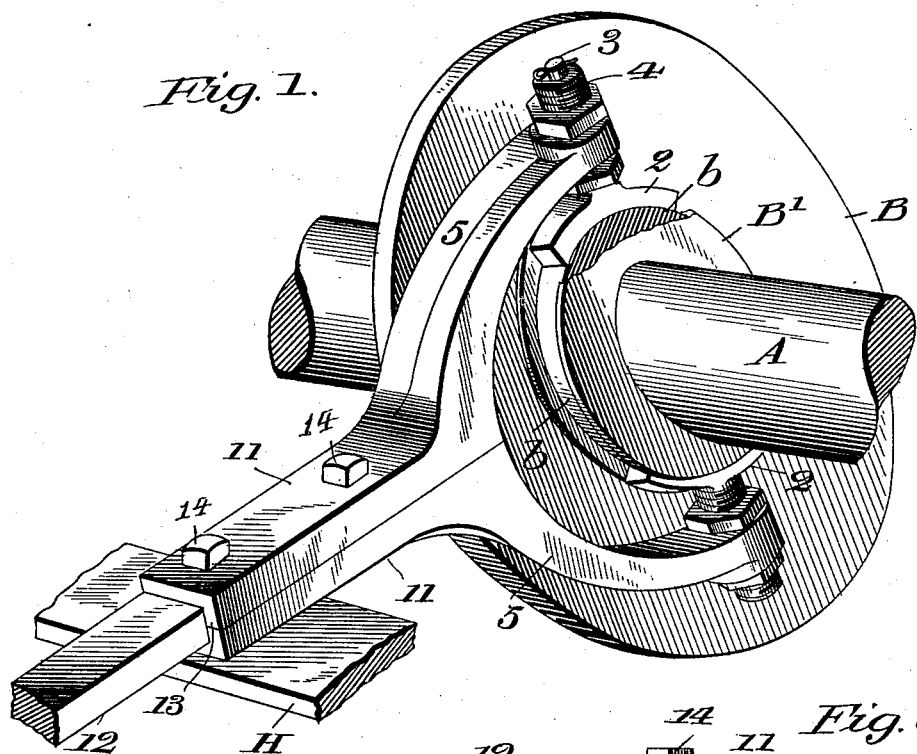
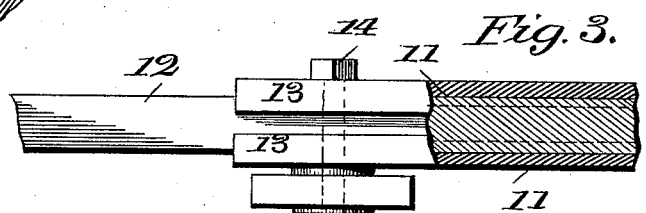
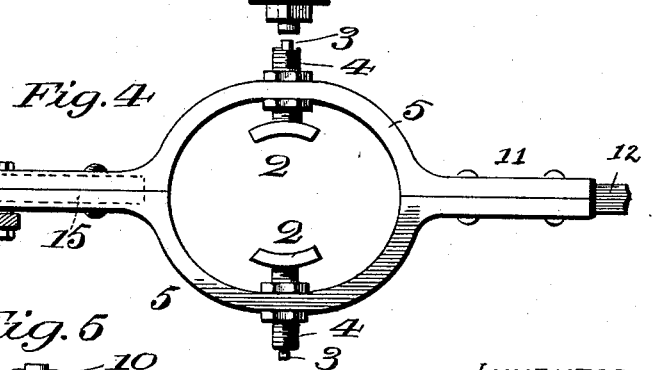
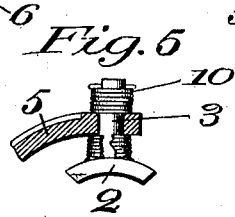
WITNESSES:
L. C. Hills
C. E. Merriam
INVENTOR
Christopher W. Levalley
BY J. S. Barker
his Attorney

UNITED STATES PATENT OFFICE.

CHRISTOPHER W. LEVALLEY, OF MILWAUKEE, WISCONSIN.

CLUTCH-SHIPPER.

SPECIFICATION forming part of Letters Patent No. 671,602, dated April 9, 1901.

Application filed February 10, 1900. Serial No. 4,782. (No model.)

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Clutch-Shippers, of which the following is a specification.

This invention has for its object to produce an adjustable shipper for clutches and like mechanical elements—that is to say, a shipper in which the distance between the engaging members may be increased or diminished within reasonable limits to fit the same to their seat or seats in the hub or parts with which they engage or to accommodate the shipper to hubs of larger or smaller sizes.

To this end the invention consists in a shipper the engaging shoes or segments of which are supported in a novel manner, whereby the desired adjustment may be effected and at the same time they be securely held, so as to constitute a durable and efficient shipper; and the invention further consists in a shipper in which the fork, yoke, or other support for the shoes or segments is made in two parts, which are so mounted and supported as to be adjustable toward and from each other.

In the drawings, wherein I have illustrated my invention, Figure 1 is a perspective view of one form of the same. Fig. 2 is a detail view of one of the shipper segments or shoes, the means whereby it is adjustably supported being represented in section. Fig. 3 is a detail view, partly in section, illustrating the manner of supporting the yoke or other support for the shipper-segments, whereby it may be adjusted. Fig. 4 is an elevation representing a different form of my invention from that shown in Fig. 1. Fig. 5 is a detail view illustrating a different means for mounting and adjusting the shipper segment or shoe from that shown in the other views.

Referring particularly to the form of invention shown in Fig. 1, A represents a shaft, and B a disk splined thereto and sliding thereon, such part serving herein as an exponent of any movable rotary machine element controlled by a shipper—such, for instance, as the sliding member of a clutch. B' is the hub of the disk B, which is represented as being provided with a circumferential groove $b$, in which are mounted the engaging members of the shipper. These shipper members are represented for the purpose of the present description as shoes or segments 2, which are provided with integral shanks or pivotal stems 3, which latter are mounted in sockets 4, in which they are free to turn. The support or socket in which the stem of the shipper shoe or segment is mounted is adjustably supported in an arm 5 of the shipper fork or yoke. It will be understood that the arms 5 and the parts which they carry are duplicated in order that the movable machine element may be engaged by the shipper upon the opposite sides. The preferred form of socket or adjustable support for the stem or shank 3 of the shipper-segment is represented in Figs. 1, 2, and 4, and consists of a sleeve externally screw-threaded from end to end and having an internal bore of a size to fit accurately over the shank 3. The shank or stem 3 is held in place in the socket 4 by means of a washer 6 and cotter-pin 7 or equivalent devices, which, while permitting the stem to freely rotate or turn within the socket, prevent any longitudinal movement of these parts relative to each other. The screw-threaded sleeve which constitutes the socket of the stem of the shipper segment or shoe passes loosely through an aperture 8 in the carrying-arm 5, and nuts 9, engaging with the exterior screw-thread of the sleeve 4 and bearing against the opposite faces of the arm 5, constitute means whereby the sleeve may be adjusted and after adjustment securely held in place.

Instead of supporting the shipper shoe or segment as just described and as represented in Fig. 2 it may be adjustably supported, as represented in Fig. 5. In this view the socket in which the stem 3 of the shoe is mounted is formed of a plurality of annular disks or plates 10. These plates or disks are arranged part on one side of the arm 5 and part on the other side thereof, and the stem or shank of the shipper-shoe is held in place in the socket or seat formed by the alining central apertures through these plates by means of the cotter-pin 7. It will be readily understood that the segment or shoe 2 may be adjusted by shifting the plates or disks 10 from one side of the arm to the other, thus changing the relative number of plates upon either side of the arm 5 and correspondingly varying the position of the shoe 2 relative to such arm.

It will be observed that in both forms of the invention which have been thus far described the stem or shank of the shipper-shoe is mounted in a socket or support in which it is free to turn, and is yet held against longitudinal movement, and that this socket or support is securely but adjustably mounted in an arm of the shipping-lever or equivalent element. By this arrangement the required adjustment of the shipper shoes or blocks may be easily effected, and when they are once properly adjusted they may be set or locked in position with the assurance that there is little danger of their working loose or the adjustment becoming accidentally changed. Besides this the stems or shanks of the shipper-blocks are securely seated, while at the same time being free to turn, and such turning or swiveling of the shipper-shoes does not tend to affect the adjustment. A construction which permits swiveling or turning of the shoes in their mountings is necessary where the shipper is in the form of a lever, because the shipper, moving about its pivot or axis, carries the stems of the shoes in the arc of a circle, while the member with which the shoes engage moves on right lines, and therefore the angular relation of the shoes to the shipper-arms 5 varies with every movement of the shipper-lever. In a construction where there is not this change in the angular relations of the parts the swiveling feature of construction might be dispensed with, the shanks 3 and the sockets in which they are mounted being so arranged that the turning or swiveling of the former in the latter could not take place while at the same time the adjustable features were maintained.

It is sometimes desirable that a greater range of adjustment should be secured than is possible by the means which have been thus far described, and this can be attained by the features of invention which I will now describe. The carrying-arms 5, whether together arranged to constitute a fork, as shown in Fig. 1, or to constitute a yoke, as shown in Fig. 5, are separate one from the other. Each arm 5 is preferably formed with a stem or shank portion 11, which is secured to the shipping-lever 12. The shank portions 11 of the arms are provided with edge flanges 13, the flanges of the two arms projecting in opposite directions, so that when the shanks are arranged together or opposite one another there is formed a socket in which the handle or lever 12 is adapted to enter. The two shanks 11 are secured to each other and to the handle 12 by bolts 14. One of these bolts may serve as a pivot or fulcrum for the shipper devices in Fig. 1, such bolt being represented as uniting the shipper-lever with a frame-beam H. It will be readily understood that if the bolts 14 be removed and a handle or lever 12 of greater thickness than the one shown in Fig. 1—such, for instance, as one represented in Fig. 3—be used instead the arms 5 will be separated and the blocks or shoes D correspondingly separated. On the other hand, if a thinner handle be employed the shoes will be brought closer together.

When a form of invention like that represented in Fig. 4 is employed—that is, one wherein the arms are shaped so as to form a yoke—I prefer that the arm should be provided at either end with shanks 11. The shipper lever or handle 12 may then be connected with one set of shanks or arms 11, while the other set of arms may be pivoted to the frame-beam H. In this form of my invention there should be employed spacing-blocks 15 between the arms or shanks 11, which are opposite the arms or shanks with which the lever or handle 12 is connected. When it is desired to adjust the arms 5 of this form of my invention, the bolts 14 are removed and both the handle 12 and the spacing-piece 15 changed, as circumstances may require, it being understood that the handle 12 and the spacing piece or block 15 should be of the same thickness.

Having described my invention, what I claim, and desire to secure by Letters Patent, is—

1. The combination with a movable machine element, of a shipper device therefor, comprising a shoe which engages with the said movable machine element and is provided with a stem or shank rigid therewith, a socket in which the said stem or shank is mounted so as to be free to turn, a shipper arm or lever which carries the said socket, and means for adjusting the socket in the arm, whereby the said shoe is movable toward and from the arm, substantially as set forth.

2. The combination with a movable machine element, of a shipper therefor, comprising a shoe adapted to engage with such machine element, a shipper arm or lever, a socket carried by the said shipper arm or lever and adjustable relative thereto, a stem or shank carried by the said shoe and rigid therewith and mounted in the said socket wherein it is free to turn and means for holding this stem or shank in the said socket so as to prevent longitudinal movement of one relative to the other, substantially as set forth.

3. The combination with a movable machine element, of a shipper therefor, comprising a shoe adapted to engage with the said machine element and provided with a shank or stem, an externally-screw-threaded sleeve constituting a socket in which the said shank or stem is mounted, and in which it is free to turn, a shipper arm or lever by which the said screw-threaded sleeve is supported, and nuts, engaging with the said screw-threaded sleeve and bearing against the opposite sides or faces of the arm, whereby the shoe and its socket are adjustably supported and held, substantially as set forth.

4. The combination with a movable machine element, of a pair of shipper-shoes engaging therewith, a pair of arms or levers carrying the shoes, each arm or lever being provided with a shank 11 having edge flanges 13, and a removable spacing-piece placed between and secured to the said shanks 11, whereby the said arms may be adjusted toward and from each other and the distance between the shoes varied by the use of spacing-pieces of different thicknesses, substantially as set forth.

CHRISTOPHER W. LEVALLEY.

Witnesses:
WM. C. FRYE,
JOSEPH LOCH.